United States Patent
Suryavanshi et al.

(10) Patent No.: US 9,883,361 B2
(45) Date of Patent: Jan. 30, 2018

(54) DELIVERING TIME SYNCHRONIZED ARBITRARY DATA IN AN RTP SESSION

(71) Applicant: QUALCOMM Incorporated, San Diego, CA (US)

(72) Inventors: Vijay Anandrao Suryavanshi, San Diego, CA (US); Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 13/950,593

(22) Filed: Jul. 25, 2013

(65) Prior Publication Data

US 2014/0029477 A1    Jan. 30, 2014

Related U.S. Application Data

(60) Provisional application No. 61/676,476, filed on Jul. 27, 2012.

(51) Int. Cl.
*H04L 29/06* (2006.01)
*H04W 4/16* (2009.01)

(52) U.S. Cl.
CPC ............. *H04W 4/16* (2013.01); *H04L 65/608* (2013.01)

(58) Field of Classification Search
None
See application file for complete search history.

(56) References Cited

U.S. PATENT DOCUMENTS

| | | |
|---|---|---|
| 6,941,383 B1 | 9/2005 | Getsin et al. |
| 6,947,448 B2 | 9/2005 | Tomita |
| 7,130,282 B2 | 10/2006 | Black |
| 7,965,659 B1 | 6/2011 | Doran |
| 9,088,630 B2 | 7/2015 | Gupta et al. |
| 2005/0180341 A1* | 8/2005 | Nelson ............... H04N 7/147 370/260 |
| 2007/0237144 A1 | 10/2007 | Adhikari et al. |

(Continued)

FOREIGN PATENT DOCUMENTS

| | | |
|---|---|---|
| KR | 100259821 B1 | 6/2000 |
| WO | WO-04028113 | 4/2004 |

(Continued)

OTHER PUBLICATIONS

Civanlar et al., "RTP Payload Format for Real-Time Pointers", RFC 2862, Jun. 2000.*

(Continued)

*Primary Examiner* — Gregory Sefcheck
*Assistant Examiner* — Jenkey Van
(74) *Attorney, Agent, or Firm* — MG-IP Law, P.C.

(57) ABSTRACT

The disclosure relates to wireless communications. An aspect generates a plurality of packets of data, each packet comprising a header and a payload of media data, receives opaque data related to a payload of at least one packet, and embeds the opaque data in an extension header of the at least one packet. An aspect receives a plurality of packets of data, each packet comprising a header and a payload of media data, and receives opaque data related to a payload of at least one packet, the opaque data embedded in an extension header of the at least one packet.

34 Claims, 12 Drawing Sheets

(56) References Cited

U.S. PATENT DOCUMENTS

| | | | |
|---|---|---|---|
| 2008/0108343 A1* | 5/2008 | Kwak | H04H 60/13 455/418 |
| 2008/0212499 A1* | 9/2008 | Maes | 370/265 |
| 2008/0318593 A1* | 12/2008 | Cao | H04W 4/02 455/456.1 |
| 2009/0204812 A1 | 8/2009 | Baker et al. | |
| 2009/0257433 A1* | 10/2009 | Mutikainen et al. | H04L 65/1006 370/392 |
| 2010/0050222 A1* | 2/2010 | Legallais | H04N 7/16 725/112 |
| 2010/0128770 A1* | 5/2010 | Stanciu | H04L 12/2697 375/228 |
| 2011/0063502 A1* | 3/2011 | Legallais | G11B 27/3027 348/495 |
| 2012/0036277 A1 | 2/2012 | Stokking et al. | |
| 2013/0083808 A1* | 4/2013 | Sridhar | H04L 65/605 370/475 |

FOREIGN PATENT DOCUMENTS

| | | |
|---|---|---|
| WO | 2010049312 A1 | 5/2010 |
| WO | WO-2011008789 | 1/2011 |

OTHER PUBLICATIONS

International Search Report and Written Opinion—PCT/US2013/052380—ISA/EPO—dated Nov. 8, 2013.

Mandyam G., "RTCWeb Data Stream and RTP Synchronization; draft-mandyam-rtcweb-data-synch-00.txt", Internet Engineering Task Force (IETF), Standardworkingdraft, Internet Society (ISOC) 4, Rue Des Falaises Ch—1205 Geneva, Switzerland, Jul. 30, 2012, pp. 1-9, XP015086625, [retrieved on Jul. 30, 2012].

Schulzrinne, et al., "RTP: A Transport Protocol for Real-Time Applications", rfc3550.txt, Jul. 1, 2003, XP015009332, ISSN: 0000-0003.

D. Singer et al., "A general mechanism for RTP Header Extensions," RFC 5285, IETF Internet Draft (Jul. 2008).

* cited by examiner

US 9,883,361 B2

DELIVERING TIME SYNCHRONIZED ARBITRARY DATA IN AN RTP SESSION

CROSS-REFERENCE TO RELATED APPLICATIONS

The present application for Patent claims the benefit of Provisional Application No. 61/676,476, entitled "DELIVERING TIME SYNCHRONIZED ARBITRARY DATA IN AN RTP SESSION," filed Jul. 27, 2012, assigned to the assignee hereof and hereby expressly incorporated herein by reference in its entirety.

FIELD OF DISCLOSURE

This disclosure relates to wireless communications, and more specifically, to delivering time synchronized arbitrary data in a real-time transport protocol (RTP) session.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using unicast, broadcast, multicast, or a combination of each.

In a multimedia session between two or more users, the users may wish to overlay or superimpose another media or arbitrary data over the existing media. For example, in a video chat session, a user may wish to draw an animation on the screen that would be overlayed on the streaming video at the target device. This requires stringent time synchronization between the video and the overlay animation.

SUMMARY

The disclosure relates to wireless communications. A method for wireless communications includes generating a plurality of packets of data, each packet comprising a header and a payload of media data, receiving opaque data related to a payload of at least one packet, and embedding the opaque data in an extension header of the at least one packet.

A method for wireless communications includes receiving a plurality of packets of data, each packet comprising a header and a payload of media data, and receiving opaque data related to a payload of at least one packet, the opaque data embedded in an extension header of the at least one packet.

An apparatus for wireless communications includes logic configured to generate a plurality of packets of data, each packet comprising a header and a payload of media data, logic configured to receive opaque data related to a payload of at least one packet, and logic configured to embed the opaque data in an extension header of the at least one packet.

An apparatus for wireless communications includes logic configured to receive a plurality of packets of data, each packet comprising a header and a payload of media data, and logic configured to receive opaque data related to a payload of at least one packet, the opaque data embedded in an extension header of the at least one packet.

An apparatus for wireless communications includes means for generating a plurality of packets of data, each packet comprising a header and a payload of media data, means for receiving opaque data related to a payload of at least one packet, and means for embedding the opaque data in an extension header of the at least one packet.

An apparatus for wireless communications includes means for receiving a plurality of packets of data, each packet comprising a header and a payload of media data, and means for receiving opaque data related to a payload of at least one packet, the opaque data embedded in an extension header of the at least one packet.

A non-transitory computer-readable medium for wireless communications includes at least one instruction to generate a plurality of packets of data, each packet comprising a header and a payload of media data, at least one instruction to receive opaque data related to a payload of at least one packet, and at least one instruction to embed the opaque data in an extension header of the at least one packet.

A non-transitory computer-readable medium for wireless communications includes at least one instruction to receive a plurality of packets of data, each packet comprising a header and a payload of media data, and at least one instruction to receive opaque data related to a payload of at least one packet, the opaque data embedded in an extension header of the at least one packet.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
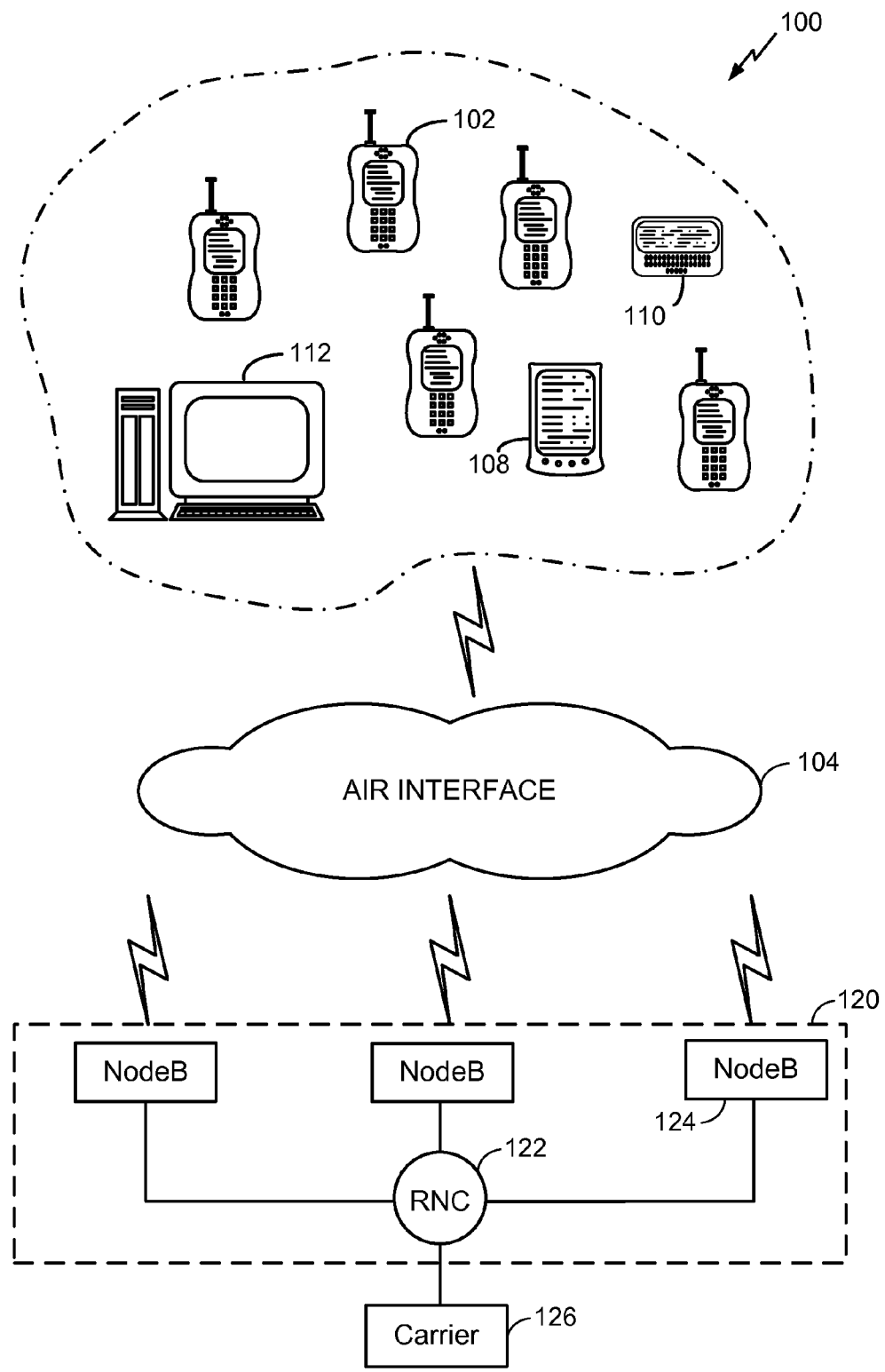
FIG. 1 is a diagram of a wireless network architecture that supports access terminals and access networks in accordance with at least one embodiment of the invention.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the terms "embodiments" or "embodiments of the invention" do not require that all embodiments include the discussed feature, advantage or mode of operation.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the various embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. The various embodiments can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station," and variations thereof.

Referring back to FIG. 1, the components of the wireless communications system 100 and interrelation of the elements of the various embodiments are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the various embodiments are not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
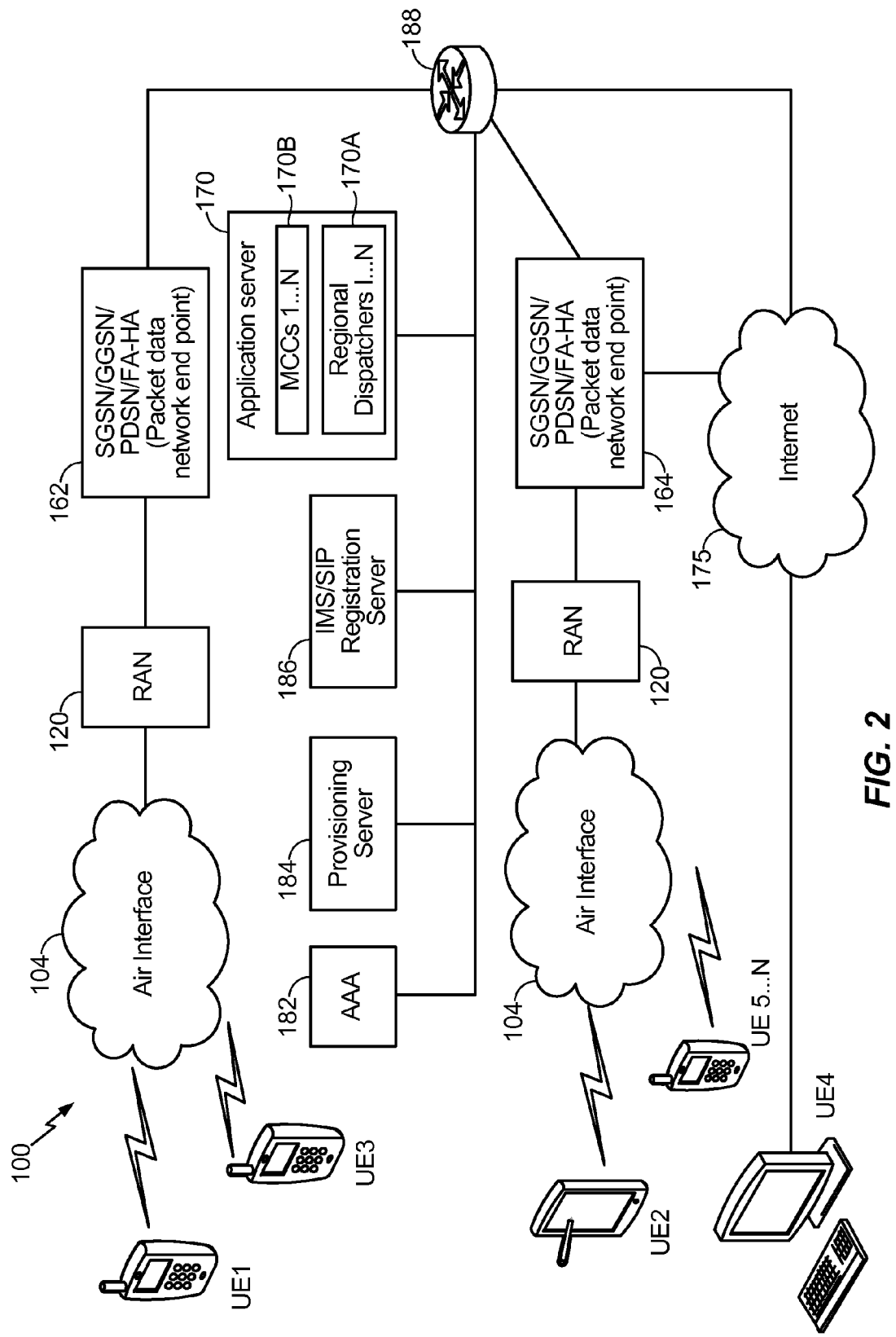
FIG. 2 illustrates an example of the wireless communications system of FIG. 1 in more detail.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2, UEs 1, 3 and 4 . . . N are illustrated as wireless cell-phones, UE 2 is illustrated as a wireless tablet- and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
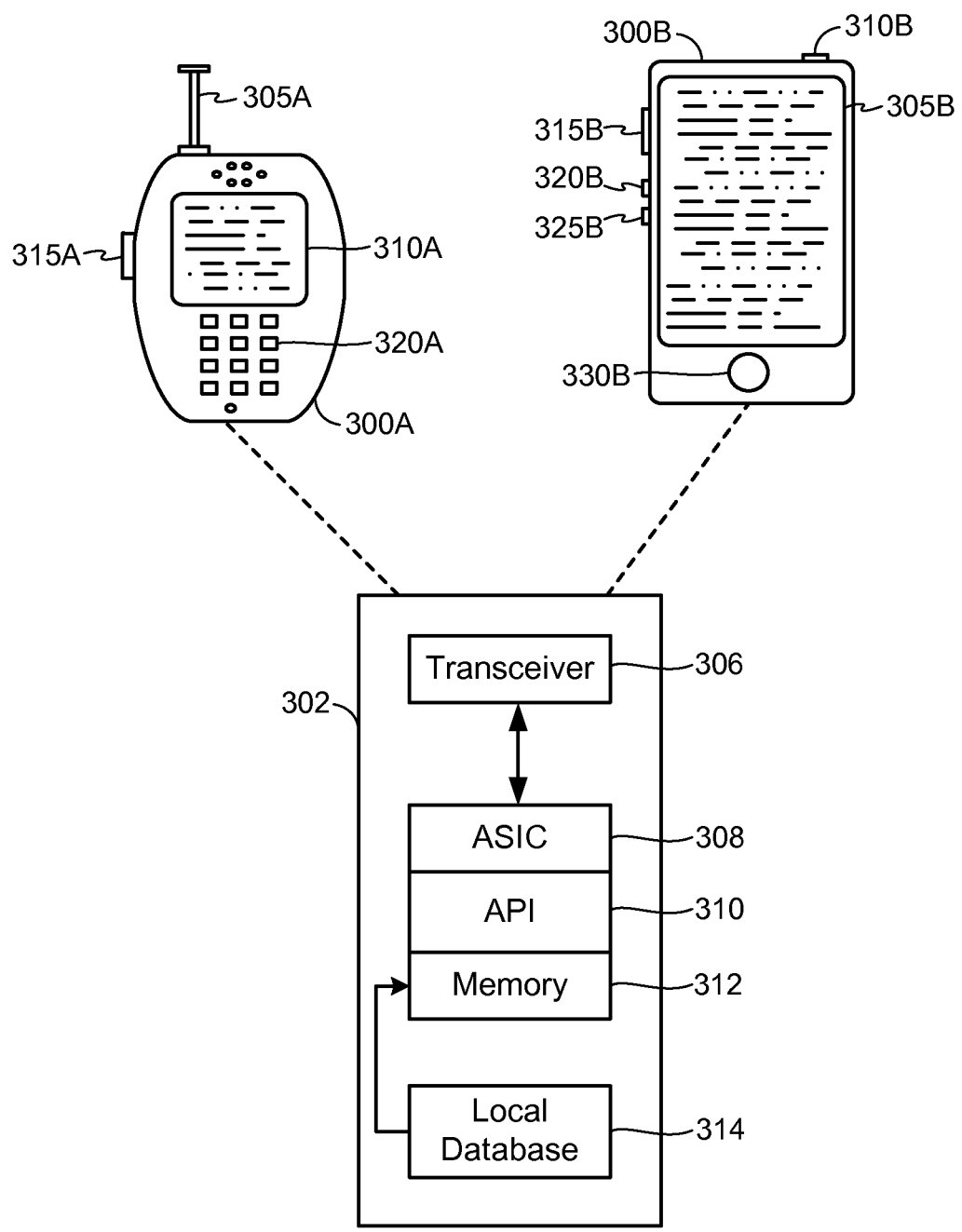
FIG. 3 illustrates examples of user equipments (UEs) in accordance with aspects of the disclosure.

FIG. 3 illustrates examples of UEs in accordance with aspects of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only memory (ROM) or random-access memory (RAM), electrically erasable programmable ROM (EEPROM), flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the disclosure is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 4:
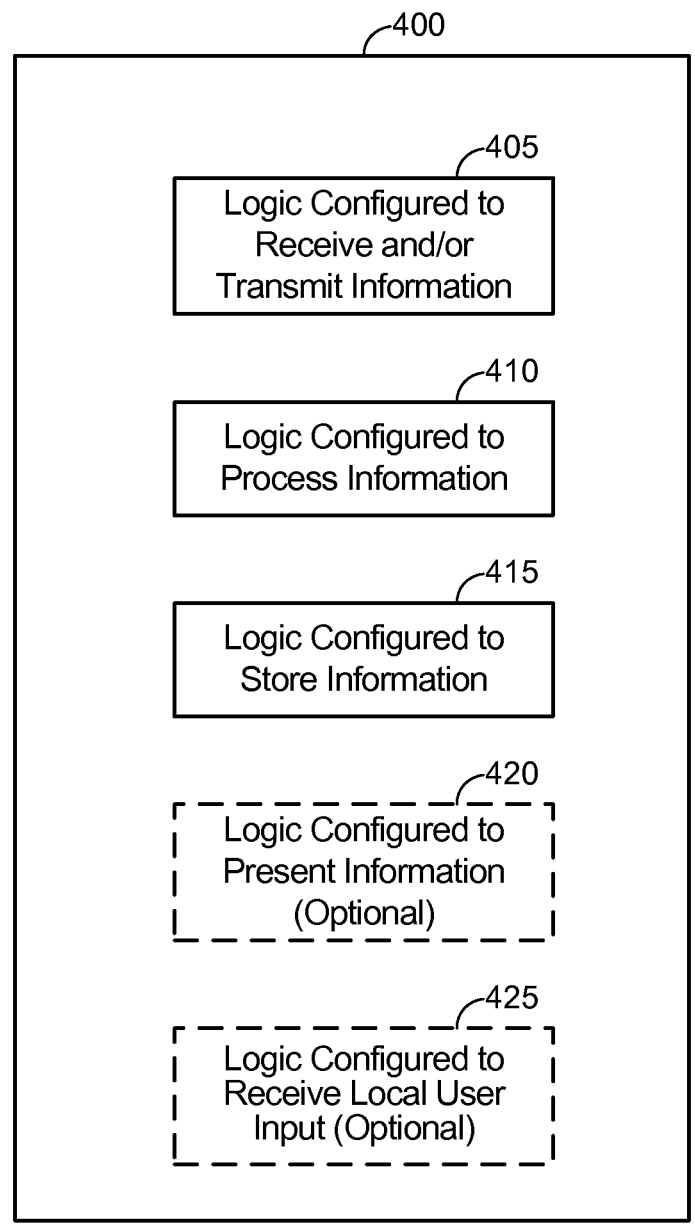
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., Node B 124, UE 300A or 300B, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. The logic configured to receive and/or transmit information 405 may include logic configured to receive opaque data related to a payload of at least one packet, logic configured to receive a plurality of packets of data, each packet comprising a header and a payload of media data, and logic configured to receive opaque data related to a payload of at least one packet, the opaque data embedded in an extension header of the at least one packet. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the logic configured to process information 410 may include logic configured to generate a plurality of packets of data, each packet comprising a header and a payload of media data, logic configured to receive opaque data related to a payload of at least one packet, logic configured to embed the opaque data in an extension header of the at least one packet, logic configured to receive a plurality of packets of data, each packet comprising a header and a payload of media data, and logic configured to receive opaque data related to a payload of at least one packet, the opaque data embedded in an extension header of the at least one packet. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM, flash memory, ROM, erasable programmable ROM (EPROM), EEPROM, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 5:
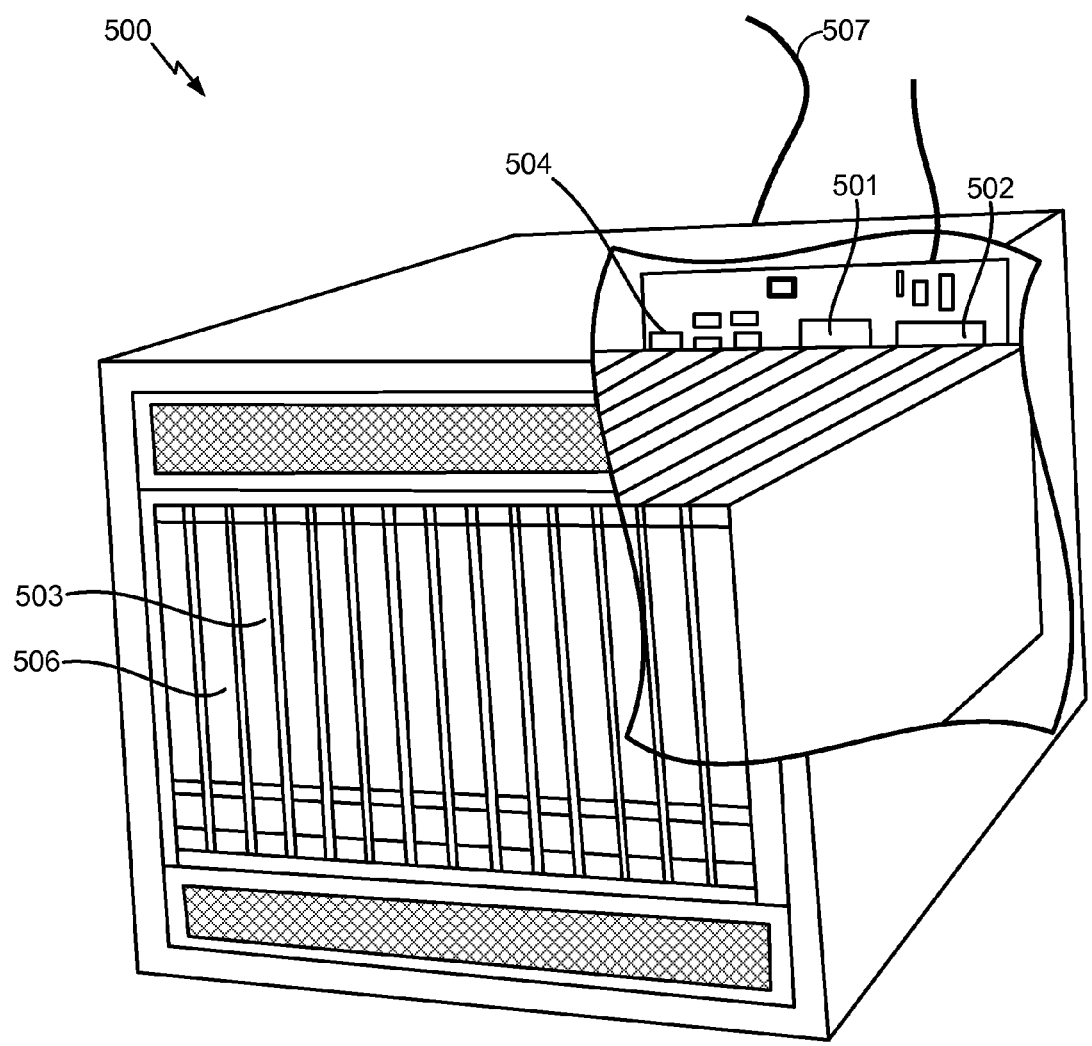
FIG. 5 illustrates an exemplary server according to various aspects of the disclosure.

Various aspects of the disclosure may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

The Real Time Communications Web (RTCWeb) standard proposed by the World Wide Web Consortium (W3C) seeks to define the necessary interoperability specifications required for real-time peer-to-peer (P2P) communications sessions between browsers. These communications sessions normally involve multimedia data transmission, such as audio, video, or both. However, the RTCWeb standard also includes the ability for web applications to initiate data streaming sessions between browsers.

One of the recommended transport protocols for audio and/or video in RTCWeb sessions is the real-time transport protocol (RTP). An RCTWeb session can include one or more RTP streams, with each stream identified by a synchronization source (SSRC) included in the RTP header.

Existing mechanisms in RTP standards may not allow an RTP session endpoint to render multiple SSRC's in a time-synchronized manner. As a result, several mechanisms have been proposed that would allow an RTCWeb endpoint to definitively determine which SSRC's are temporally synchronized and must be rendered as such.

Even though temporally-synchronized SSRC's can be associated, there can still be cases where an SSRC may have a temporal relationship with application-generated data (i.e., opaque data) that should also be streamed as part of the RTCWeb session. An example would be a video overlay based on web touch events during a video telephony session. In this case, a web application detects an animation over the video preview (based on the end user drawing an image using the device touch surface), and is required to send such information to the RTCWeb endpoint so that the animation can be rendered.

Time synchronizing opaque data with a media stream is required whenever the opaque data needs to be rendered in conjunction with the media stream at the receiver. For example, in the video overlay scenario, the application sending the video stream uses a touch event API to capture a user drawing on the video preview. The application then formats the touch events and sends them to the receiver via an opaque data stream. The opaque data may be the coordinates associated with the pixels of the video stream where the overlay exists. The receiver then renders the drawing animation and the video stream simultaneously on the local display.

The Internet Engineering Task Force (IETF) has focused on two transport protocols for transmitting media and generic application data: RTP for the media streams and the stream control transmission protocol (SCTP) for the generic application data.

There are several methods for synchronizing RTP streams where the streams have the same host endpoints but different SSRC's. Different SSRC's means, for example, that the audio may be transmitted in one RTP session and the video in another. In one method, a session description protocol (SDP) grouping mechanism can be used when there is one SSRC per RTP stream. In another method, a canonical name (CNAME) can be used across SSRC's. In another method, the media stream identifier (MSID) can be used to group SSRC's. These grouping mechanisms, however, only apply to the RTP transport. Opaque data stream synchronization is not handled in any of the given standardized mechanisms.

One approach that could be adopted in RTCWeb for data streaming leverages the SCTP, and another provides the necessary extensions to the session description protocol (SDP) to describe an SCTP stream. SDP is the mechanism by which multimedia sessions are described in RTCWeb, usually as part of the invite or call announce. The m-line in the SDP message could include sufficient information to describe the SCTP session (e.g., plain SCTP, SCTP over Datagram Transport Layer Security (DTLS), etc.). For example, given an SDP message from an offerer at address xxx.xx.xx.xx using port yyyyy for SCTP communication, then a possible SDP offer would include m=application yyyyy SCTP*
c=IN IP4 xxx.xx.xx.xx If there is an additional RTP-based media source sent by the offerer that needs synchronization with the SCTP stream, the ideal case would be to leverage existing SDP grouping mechanisms. The mid attribute of the SDP grouping framework could potentially be leveraged. For example:

c=IN IP4 xxx.xx.xx.xx
a=group:LS 1 2
m=application yyyyy SCTP*
a=mid: 1
m=video zzzzz RTP/AVP
a=mid:2

There are some issues with this approach, however, such as the case where there are multiple SSRC's in each RTP stream. Nevertheless, SDP grouping can provide a sufficient solution to synchronizing the SCTP stream to an RTP stream as long as there is only one SSRC per RTP stream. SDP grouping should also be applicable in the case where multiple SSRC's are part of the offer and are associated with a CNAME, using the attribute guidelines of the source-specific media attributes in the SDP (e.g., "a=ssrc:<ssrc-id>cname:<cname>" along with "a=mid: . . . ").

In another approach, an out-of-band mechanism like MSID can be leveraged to associate the SCTP port number with the SSRC's of the RTP stream. For example, a possible SDP offer could include:

m=video 51372 RTP
a=ssrc:1234 msid:examplefoo
m=application 54321 SCTP*
a=msid: examplefoo There are issues with this approach too, however. For example, logical channel identifiers negotiated within the SCTP session may not be accessible for inclusion in the SDP attributes. Logial channels in SCTP are more dynamic than SSRC's, and they can appear at any time. Another issue is that there is no inherent timestamping in SCTP, so synchronization is not assured.

Yet another approach provides an SCTP-encapsulated control protocol for the RTCWeb data channel that takes advantage of the multistreaming capabilities of SCTP. SCTP allows for individual stream identifiers and associated sequence numbers for any given data chunk. This allows for flow control on individual streams within an SCTP session. Streams are also further identified by a label attribute as part of the logical channel request. Since the streams are dynamic, to associate an SCTP stream at any given instant in time with an RTP session is not straightforward. In addition, SCTP can be multihomed, i.e., the endpoints can be associated with more than one IP address.

An issue with this approach is the question of whether the SDP attribute describing the data channel stream should be based on logical channel label or SCTP stream ID. Another issue is the question of what the required receiver behavior is if the data channel stream identifier provided in the SDP offer does not match with the information sent in-band. Note that a comparable issue also exists for RTP streams using CNAME and SSRC.

In order to address these issues in a simpler manner, the following guideline is proposed for RTCWeb: the SDP grouping mechanism should not address individual streams within an SCTP session. In other words, once a temporal relationship is established between an RTP stream and an SCTP session, that relationship will apply to all streams in the SCTP session.

Another approach for synchronizing opaque data with a related media stream leverages RTP streaming for the opaque data. For instance, a separate RTP stream can be initiated within the same session. However, this would still require time synchronization between the two RTP streams. Also, opening up another User Datagram Protocol (UDP) socket might not be trivial in some cases. For example, wireless operators generally restrict opening up multiple UDP sockets in their network. Further, since opaque data transmission is typically asynchronous and infrequent, RTP inactivity timers would likely kick in and tear down the RTP stream for opaque data.

Alternatively, the opaque data could be multiplexed with the primary media. In that case, the RTP payload would consist of opaque data followed by the primary media in the same RTP packet. However, there are interoperability issues with this approach since non-conforming applications would assume the opaque data to be part of the primary media. This also violates the RTP standard.

In another alternative, the opaque data could be embedded within the primary media. Specifically, the bits associated with the opaque data can be embedded within the bit syntax of the primary media. However, this would require a specialized encoder/decoder, and applications typically rely on the standard multimedia stack prevalent on the platform.

The various aspects of the disclosure overcome these and other issues by using the RTP extension header to send periodic opaque data multiplexed in the RTP media stream. This has the advantage of making the synchronization mechanisms for RTP possible for opaque data. The receiver recognizes the extension header and forwards the data to the web application. Depending on the RTP implementation, the extension header may also be leveraged for purposes other than opaque data transmission. For example, the first two octets of the extension header field could be leveraged for defining application specific uses.

In the various aspects of the disclosure, it is assumed that RTP is the underlying media transport channel in a multimedia session. The RTP extension header can be utilized to deliver the arbitrary or opaque media, or data, in conjunction with the primary media, such as audio/video. Specifically, the opaque data can be included within the RTP extension header while the RTP payload for the same RTP packet carries the corresponding primary media. The opaque data leverages the RTP timestamp within the standard RTP header for the primary media to achieve temporal synchronization between the opaque data and the primary media. That is, the same RTP timestamp can be used for the opaque data and the primary media during playout on the target device(s). As such, in a video chat session, for example, if a first user draws an animation on his or her UI, the video will be transported in the RTP payload while the animation will be transported in the RTP extension header belonging to the same RTP packet(s).

This mechanism assumes that the opaque data occupies far less bandwidth than the primary media. That is, the opaque media will require less throughput than the primary media (in most cases). Further, it is assumed that the transmission of opaque data is less frequent compared to the primary media.

As used herein, the term "primary media" refers to media that is carried in the RTP packet(s) in the multimedia session, e.g., video, image, audio, etc. The term "opaque data" refers to application-specific, opaque, or arbitrary data or media that is carried in the extension header of the RTP packet(s) that also carries the primary media. The terms opaque data, opaque media, arbitrary data, arbitrary media, and application-specific data are used interchangeably herein.

In an aspect, the RTP extension header may contain a profile field (e.g., a 2 byte value) that conveys the specifics of the opaque data. The profile may be negotiated at the application level, possibly out-of-band. The profile identifier in the profile field associated with the opaque data in the extension header can map to the "source" that generates the opaque data. Thus, in a given RTP session, the RTP packets would carry primary media and opaque data if an RTP extension header is present, or only primary media if no RTP extension header is present.

Figure 6:
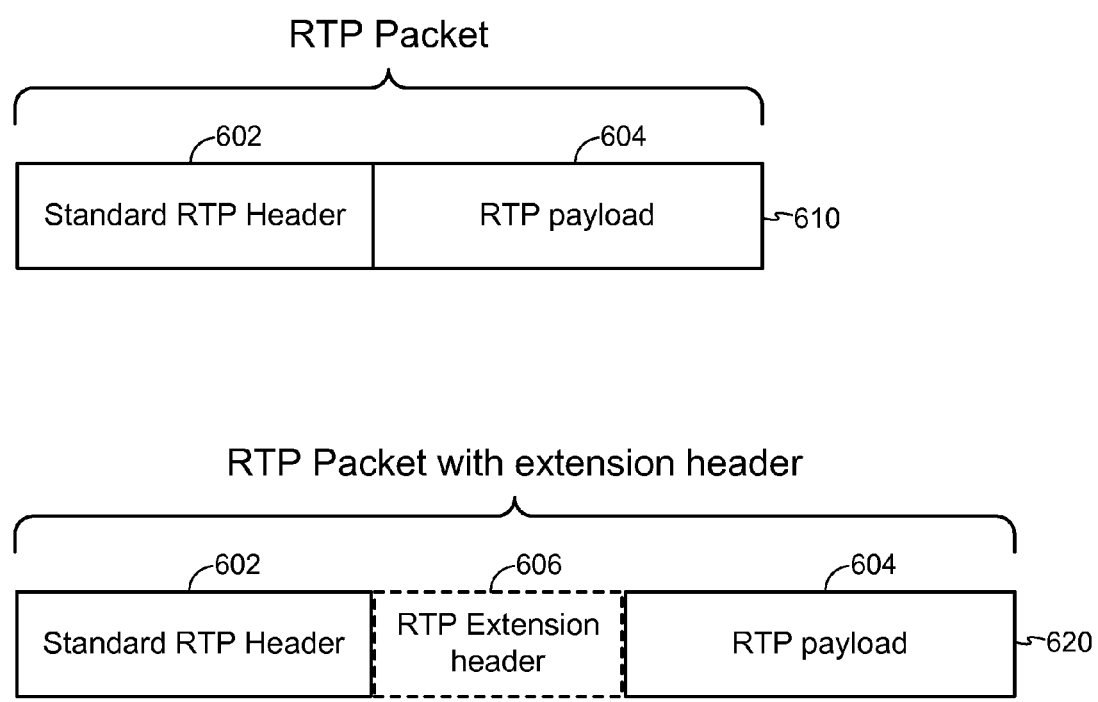
FIG. 6 illustrates an example of a real-time transport protocol packet with and without an extension header.

FIG. 6 illustrates an example of an RTP packet with and without an extension header. An exemplary RTP packet 610 includes a standard RTP header 602 and an RTP payload 604. An exemplary RTP packet 620 includes the standard RTP header 602, the RTP payload 604, and an RTP extension header 606. The RTP payload 604 contains the primary media, such as video data, and the RTP extension header 606 contains the opaque data corresponding to the RTP payload 604.

Figure 7:
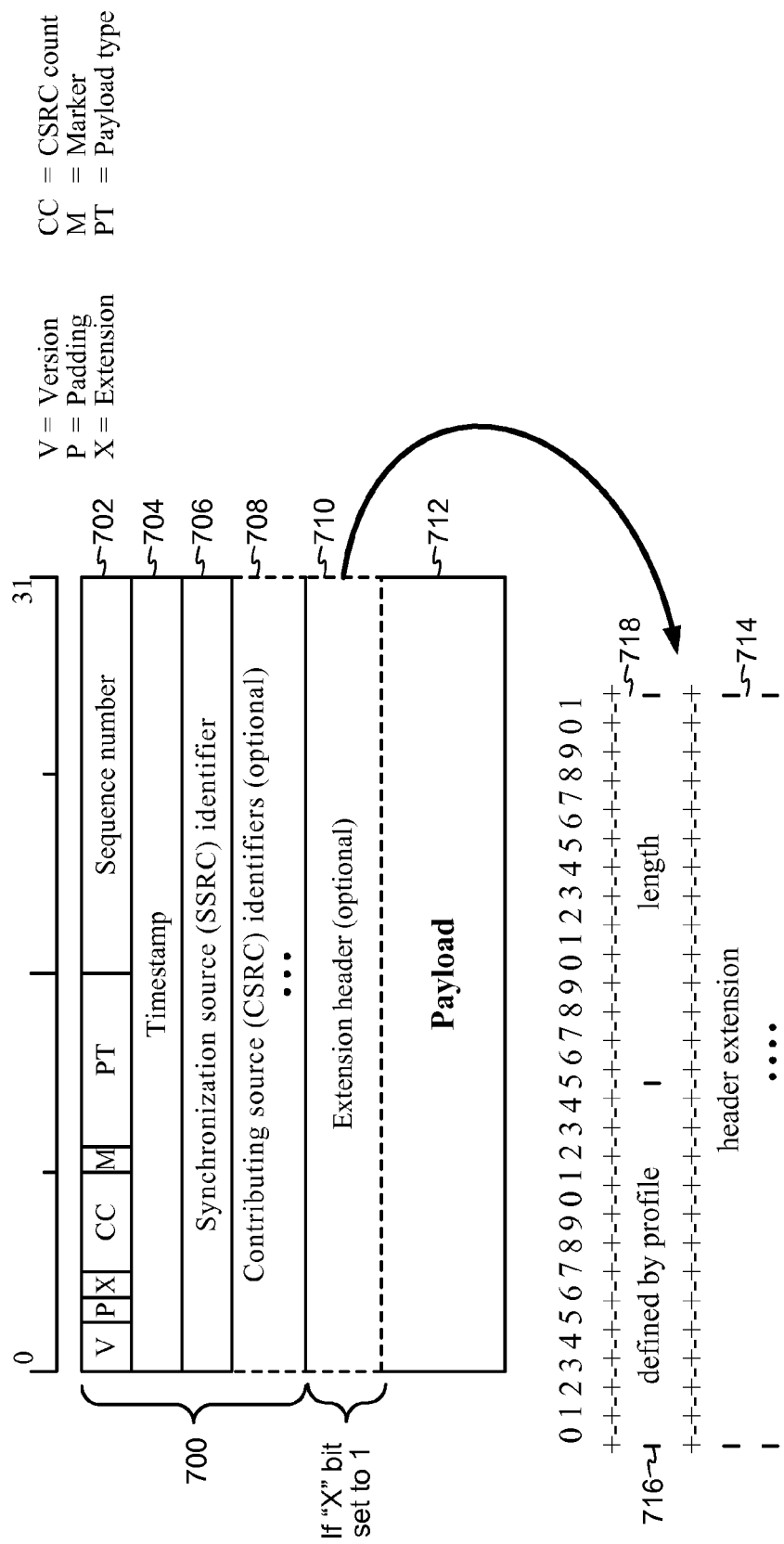
FIG. 7 illustrates an exemplary real-time transport protocol header with an exemplary extension header.

FIG. 7 illustrates an exemplary RTP packet with an RTP header 700, an extension header 710, and a payload 712. The RTP header 700 may include a sequence number 702, a timestamp 704, an SSRC identifier 706, and optional contributing source (CSRC) identifiers 708. The RTP packet may further include an optional extension header 710, which may include a profile identifier 716, a header extension length 718, and the header extension data 714. The header extension data 714 may include the opaque data corresponding to the payload 712.

In the RTP header 700, the extension bit X can be set to indicate the existence of the extension header 710. The value of the 16-bit profile identifier 716 in the extension header 710 can be implementation specific. This field could be used in place of the channel label in the SCTP-based data channel. Otherwise, this field can be ignored by the receiver.

The signaling for the use of an extension header as the means of opaque data transfer could be agreed upon by the two endpoints by means of an offer/answer protocol like SDP. The out-of-band signaling channel can be used to instruct the receiver to create a data channel based on the RTP extension header. The source-specific media attributes in the SDP can also be leveraged in this case using a new source-specific attribute, such as 'data': a=ssrc:<ssrc-id> data. The SDP exchange is not strictly required, however, because the SSRC of the RTP stream has already been negotiated, and the extension header is in fact part of the RTP media stream data.

A message-based data channel API from the RTCWeb specification can be leveraged by the web application in such a way that the underlying user agent would multiplex application data onto an existing RTP stream using the RTP extension header. The peer connection setup can then proceed as normal from the offerer perspective. Table 1 illustrates an exemplary messaging flow using the JavaScript Session Establishment Protocol (JSEP). Note that in Table 1, "JS" stands for JavaScript and "UA" for user agent.

TABLE 1

OffererJS->OffererUA: var pc = new PeerConnection(config, null);
OffererJS->OffererUA: pc.onicecandidate = onIceCandidate;
OffererJS->OffererUA: pc.addStream(stream);
OffererJS->OffererUA: var offer = pc.createOffer(null);
OffererJS->OffererUA: pc.setLocalDescription("offer", offer);
... Answerer creates PeerConnection and sends answer
AnswererUA->OffererUA: <media>
// Send opaque data from Offerer to Answerer
OffererJS->OffererUA: var Chan = pc.createDataChannel(10);
// Numeric label means opaque data to be sent with extension header
OffererJS->OffererUA: chan.send("Some Payload");
AnswererUA->OffererUA: <media> with extension header
AnswererUA->AnswererJS: pc.ondatachannel = function({...});
// Answerer creates DataChannel listener on existing PeerConnection based upon firing of onDataChannel event
OffererUA->OffererJS: datachannellistener.onmessage({ });
...

In the approach above, the creation of a data channel with a numeric label triggers the OffererUA to use the extension header. The numeric label can be sent directly as part of the profile field in the extension header, provided that the numeric label does not exceed 16 bits. The initial receipt of RTP data with an extension header triggers the on DataChannel event to fire from the AnswererUA.

Figure 8:
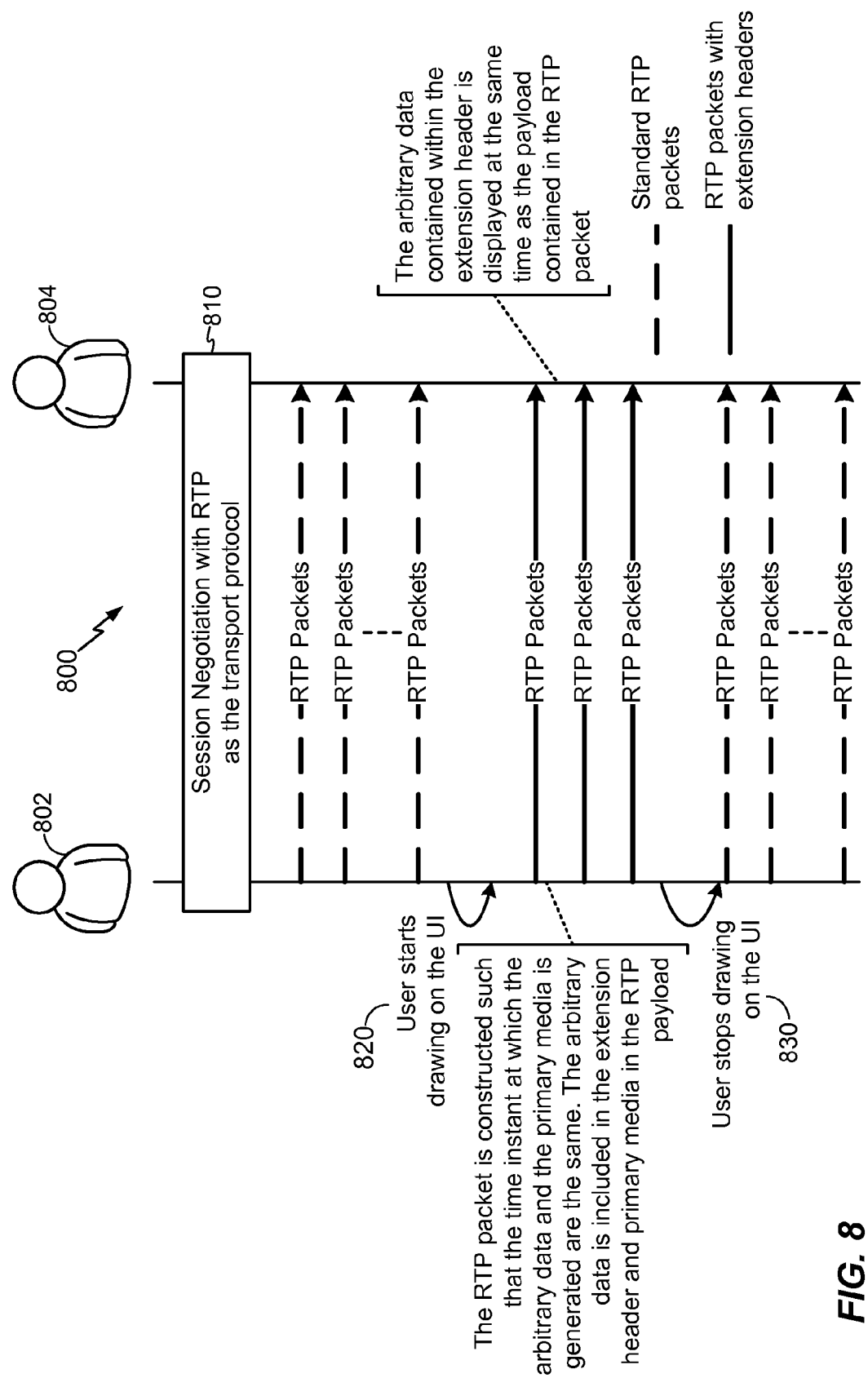
FIG. 8 illustrates an exemplary peer-to-peer call flow between a sender and a receiver.

FIG. 8 illustrates an exemplary P2P call flow 800 between a sender 802 and a receiver 804. At 810, the network performs session negotiation between the sender 802 and the receiver 804 with RTP as the transport protocol. The sender 802 then begins sending a media stream comprising a number of standard RTP packets, as indicated by the dashed lines.

At 820, the sender 802 starts receiving opaque data generated by the user drawing on the UI, for example. This causes the sender 802 to generate and send a number of RTP packets with header extensions, as indicated by the solid lines. On the sender 802 side, the RTP packet is constructed such that the time instant at which the opaque data and the primary media are generated is the same. The opaque data is included in the extension header and the primary media in the RTP payload. On the receiver 804 side, the opaque data contained within the extension header is displayed at the same time as the payload contained in the RTP packet.

At 830, the sender 802 stops receiving opaque data generated by the user drawing on the UI because, for example, the user has stopped drawing. The sender 802 continues to transmit the media stream as standard RTP packets until one of the users begins drawing on his or her UI or generating some other form of opaque data.

Figure 9:
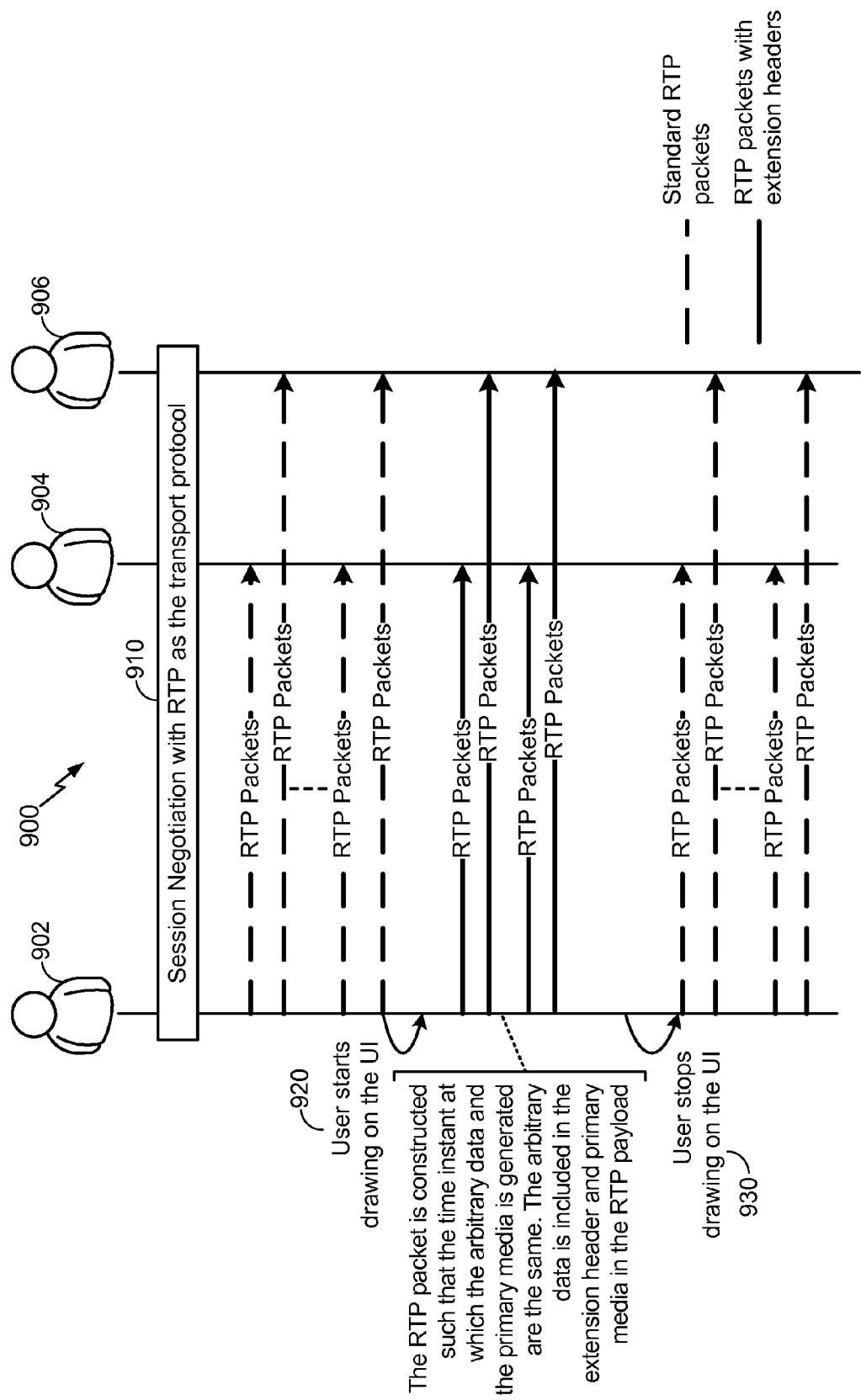
FIG. 9 illustrates an exemplary peer-to-peer call flow between a group of users comprising a sender and two receivers.

FIG. 9 illustrates an exemplary P2P call flow 900 between a group of users comprising a sender 902 and two receivers 904 and 906. At 910, the network performs session negotiation between the sender 902 and the receivers 904 and 906 with RTP as the transport protocol. The sender 902 then begins sending a media stream comprising a number of standard RTP packets, as indicated by the dashed lines.

At 920, the sender 902 starts receiving opaque data generated by, for example, the user drawing on the UI. This causes the sender 902 to generate and send a number of RTP packets with header extensions, as indicated by the solid lines. On the sender 902 side, the RTP packet is constructed such that the time instant at which the opaque data and the primary media are generated is the same. The opaque data is included in the extension header and the primary media in the RTP payload.

At 930, the sender 902 stops receiving opaque data generated by the user drawing on the UI because, for example, the user has stopped drawing. The sender 902 continues to transmit the media stream as standard RTP packets until one of the users begins drawing on his or her UI or generating some other form of opaque data.

Figure 10:
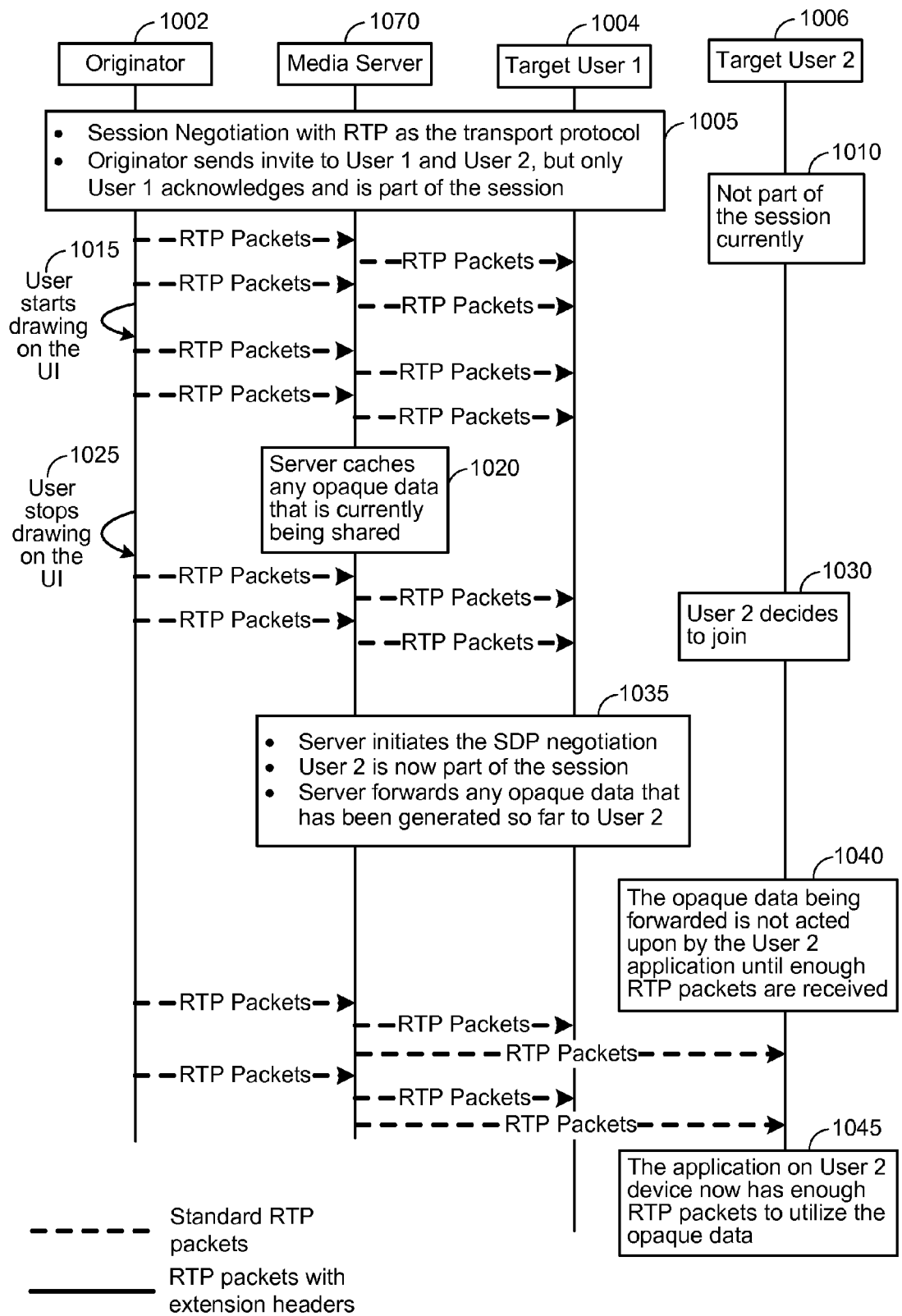
FIG. 10 illustrates an exemplary call flow for utilizing an intermediate server and having a late joiner.

FIG. 10 illustrates an exemplary call flow for utilizing an intermediate media server 1070 and having a late joining target 1006. Upon joining, the late joining target 1006 needs to get the context of the session. Accordingly, the media server 1070 can cache the opaque data so that once the late joining target 1006 is part of the session, the media server 1070 can forward the opaque data to the later joining target 1006. After receiving the "latest" primary media, the late joining target 1006 can overlay or process the opaque data. Thus, all the participants in the session will have the same context.

At 1005, the originator 1002 sends a call invitation to targets 1004 and 1006, but only target 1004 acknowledges. The media server 1070 performs session negotiation between the originator 1002 and the target 1004 with RTP as the transport protocol. The late joining target 1006 is not part of the session currently, as shown at 1010. The originator 1002 then begins sending a media stream comprising a number of standard RTP packets, as indicated by the dashed lines.

At 1015, the originator 1002 starts receiving opaque data generated by, for example, the user drawing on the UI. This causes the originator 1002 to generate and send a number of RTP packets with header extensions. On the originator 1002 side, the RTP packet is constructed such that the time instant at which the opaque data and the primary media are generated is the same. The opaque data can be included in the extension header and primary media in the RTP payload. At 1020, the media server 1070 caches any opaque data that is currently being shared.

At 1025, the originator 1002 stops receiving opaque data generated by the user drawing on the UI because, for example, the user has stopped drawing. The originator 1002 continues to transmit the media stream as standard RTP packets until one of the users begins drawing on his or her UI or generating some other form of opaque data.

At 1030, the late joining target 1006 decides to join the group call. At 1035, the media server 1070 initiates the SDP negotiation. The late joining target 1006 is now part of the session. The media server 1070 can forward any opaque data that has been generated in the call so far to the late joining target 1006. At 1040, the application on the late joining target 1006 may not act upon the opaque data being forwarded until enough RTP packets are received. During this time, the target 1004 and the late joining target 1006 continue to receive standard RTP packets. At 1045, the application on the late joining target 1006 now has enough RTP packets to utilize the opaque data, and the application renders the opaque data if appropriate.

Figure 11:
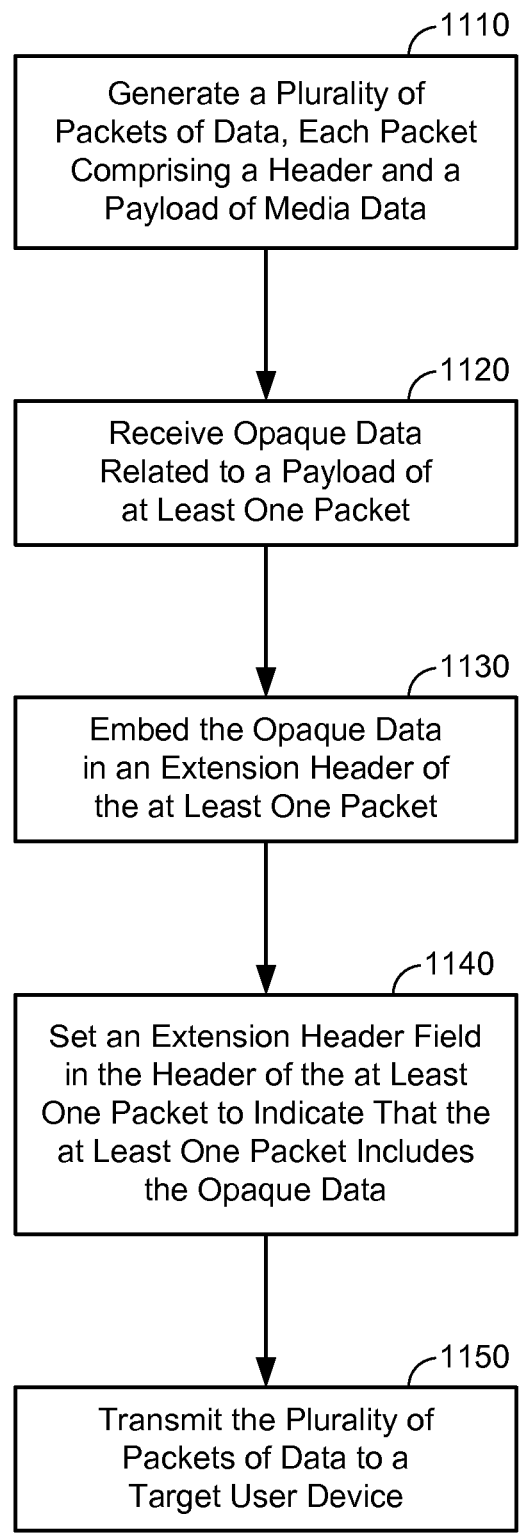
FIG. 11 illustrates an exemplary flow for wireless communications according to an aspect of the disclosure.

FIG. 11 illustrates an exemplary flow for wireless communications according to an aspect of the disclosure. The flow of FIG. 11 may be performed by a UE, such as UE 102, 108, 110, 112, 300A, or 300B.

At 1110, the UE generates a plurality of packets of data, each packet comprising a header and a payload of media data. The header may be an RTP header. The media data may be at least one of video, image, and/or audio data.

At 1120, the UE receives opaque data related to a payload of at least one packet. The opaque data may be user-generated data related to the plurality of packets of data. The user-generated data may be, for example, coordinate data generated by a user tracing on a user interface. Alternatively, the opaque data comprises data related to the plurality of packets of data that is automatically generated by an application.

At 1130, the UE embeds the opaque data in an extension header of the at least one packet. The extension header may include a profile identifier field identifying a profile indicating how the opaque data is to be processed by a target user device.

At 1140, the UE sets an extension header field in the header of the at least one packet to indicate that the at least one packet includes the opaque data. Although 1130 and 1140 are illustrated as occurring sequentially, they may occur in the reverse order (i.e., 1140 then 1130) or simultaneously.

At 1150, the UE transmits the plurality of packets of data to a target user device. The opaque data and the payload of the at least one packet may be played simultaneously by a target user device that receives the plurality of packets.

Figure 12:
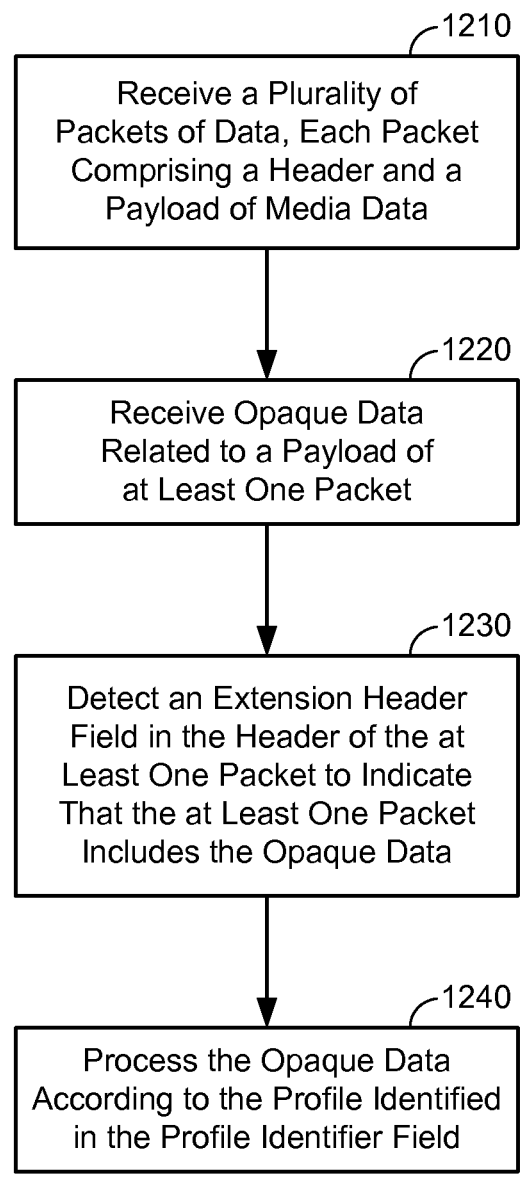
FIG. 12 illustrates an exemplary flow for wireless communications according to an aspect of the disclosure.

FIG. 12 illustrates an exemplary flow for wireless communications according to an aspect of the disclosure. The flow of FIG. 12 may be performed by a UE, such as UE 102, 108, 110, 112, 300A, or 300B, or a server, such as application server 170 or media server 1070.

At 1210, the UE/server receives a plurality of packets of data, each packet comprising a header and a payload of media data. The header may be an RTP header. The media data may be at least one of video, image, and/or audio data.

At 1220, the UE/server receives opaque data related to a payload of at least one packet, the opaque data embedded in an extension header of the at least one packet. The extension header may include a profile identifier field identifying a profile indicating how the opaque data is to be processed by a target user device. The opaque data may be user-generated data related to the plurality of packets of data. The user-generated data may be, for example, coordinate data generated by a user tracing on a user interface. Alternatively, the opaque data comprises data related to the plurality of packets of data that is automatically generated by an application.

At 1230, the UE/server detects an extension header field in the header of the at least one packet that indicates that the at least one packet includes the opaque data.

At 1240, the UE/server processes the opaque data according to the profile identified in the profile identifier field. If a UE is performing the flow illustrated in FIG. 12, the UE may play the opaque data and the payload of the at least one packet simultaneously. If a server is performing the flow illustrated in FIG. 12, the server may cache the opaque data and transmit the opaque data to a target user device when it joins an in-progress group call.

The various aspects of the disclosure provide a number of advantages. For example, there is no need for a separate channel or parallel protocol to convey the opaque data. Further, the various embodiments use the RTP timestamp inherent to the primary media for time synchronizing the opaque data. Additionally, interoperability is not an issue since the RTP extension header can be ignored if not understood by the application. Further, no modification of the primary payload or the RTP payload is required since the opaque data is conveyed independently within the same RTP packet.

The opaque data could affect the throughput associated with the primary media, since adding the extension header increases the packet size. However, the transmission of opaque data would likely be infrequent and occupy far less bandwidth than the primary media.

The fact that the various aspects require application specific logic is not an issue because this is an application-to-application feature. Further, the out-of-band negotiation of the profile associated with the opaque data is also not an issue since such a negotiation is true of any application specific feature.

There are additional uses of the RTP extension header. These uses include a rapid synchronization feature (which allows timing metadata to be inserted into the RTP stream), client-to-mixer audio level, and mixer-to-client audio level. The profile space that may be consumed by these uses of the header extension can be avoided for logical data channels that also use the header extension.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for wireless communications, comprising:
generating a plurality of packets of data, each packet comprising a header and a payload of media data;
receiving opaque data related to a payload of at least one packet of the plurality of packets of data, wherein the opaque data comprises user-generated data related to the payload of the at least one packet to be played simultaneously with the payload of the at least one packet;
embedding the opaque data in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level; and
transmitting the plurality of packets of data to the target user device,
wherein the opaque data and the payload of the at least one packet are played simultaneously by the target user device that receives the plurality of packets of data.

2. The method of claim 1, wherein the user-generated data comprises coordinate data generated by a user tracing on a user interface.

3. The method of claim 1, wherein the opaque data comprises data related to the plurality of packets of data that is automatically generated by an application.

4. The method of claim 1, wherein the media data comprises at least one of video, image, and/or audio data.

5. The method of claim 1, wherein the header comprises a real-time transport protocol (RTP) header.

6. The method of claim 1, further comprising:
setting an extension header field in the header of the at least one packet to indicate that the at least one packet includes the opaque data.

7. A method for wireless communications, comprising:
receiving a plurality of packets of data, each packet comprising a header and a payload of media data;
receiving opaque data related to a payload of at least one packet of the plurality of packets of data, wherein the opaque data comprises user-generated data related to the payload of the at least one packet to be played simultaneously with the payload of the at least one packet, the opaque data embedded in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level;
extracting the opaque data from the extension header of the at least one packet and caching the extracted opaque data;
transmitting the at least one packet to a first target user device during a group call; and transmitting the extracted opaque data to a second target user device when the second target user device joins the group call after the at least one packet has been transmitted to the first target user device.

8. The method of claim 7, wherein the user-generated data comprises coordinate data generated by a user tracing on a user interface.

9. The method of claim 7, wherein the opaque data comprises data related to the plurality of packets of data that is automatically generated by an application.

10. The method of claim 7, wherein the media data comprises at least one of video, image, and/or audio data.

11. The method of claim 7, wherein the header comprises a real-time transport protocol (RTP) header.

12. The method of claim 7, further comprising:
detecting an extension header field in the header of the at least one packet that indicates that the at least one packet includes the opaque data.

13. The method of claim 7, further comprising:
processing the opaque data according to the profile identified in the profile identifier field.

14. The method of claim 7, further comprising:
playing the opaque data and the payload of the at least one packet simultaneously,
wherein the method is performed by a user device.

15. The method of claim 7, wherein the method is performed by a media server.

16. An apparatus for wireless communications, comprising:
at least one processor configured to:
generate a plurality of packets of data, each packet comprising a header and a payload of media data;
receive opaque data related to a payload of at least one packet of the plurality of packets of data, wherein the opaque data comprises user-generated data related to the payload of the at least one packet to be played simultaneously with the payload of the at least one packet; and
embed the opaque data in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level; and
at least one transmitter configured to transmit the plurality of packets of data to the target user device,
wherein the opaque data and the payload of the at least one packet are configured to be played simultaneously by the target user device that receives the plurality of packets of data.

17. The apparatus of claim 16, wherein the user-generated data comprises coordinate data generated by a user tracing on a user interface.

18. The apparatus of claim 16, wherein the opaque data comprises data related to the plurality of packets of data that is automatically generated by an application.

19. The apparatus of claim 16, wherein the media data comprises at least one of video, image, and/or audio data.

20. The apparatus of claim 16, wherein the header comprises a real-time transport protocol (RTP) header.

21. The apparatus of claim 16, wherein the processor is further configured to:
set an extension header field in the header of the at least one packet to indicate that the at least one packet includes the opaque data.

22. An apparatus for wireless communications, comprising:
at least one processor configured to:
receive a plurality of packets of data, each packet comprising a header and a payload of media data;
receive opaque data related to a payload of at least one packet of the plurality of packets of data, wherein the opaque data comprises user-generated data related to the payload of the at least one packet to be played simultaneously with the payload of the at least one packet, the opaque data embedded in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level; and
extract the opaque data from the extension header of the at least one packet and caching the extracted opaque data; and a transmitter configured to:
transmit the at least one packet to a first target user device during a group call; and transmit the extracted opaque data to a second target user device when the second target user device joins the group call after the at least one packet has been transmitted to the first target user device.

23. The apparatus of claim 22, wherein the user-generated data comprises coordinate data generated by a user tracing on a user interface.

24. The apparatus of claim 22, wherein the opaque data comprises data related to the plurality of packets of data that is automatically generated by an application.

25. The apparatus of claim 22, wherein the media data comprises at least one of video, image, and/or audio data.

26. The apparatus of claim 22, wherein the header comprises a real-time transport protocol (RTP) header.

27. The apparatus of claim 22, wherein the at least one processor is further configured to:
detect an extension header field in the header of the at least one packet that indicates that the at least one packet includes the opaque data.

28. The apparatus of claim 22, wherein the at least one processor is further configured to:
process the opaque data according to the profile identified in the profile identifier field.

29. The apparatus of claim 22, wherein the apparatus comprises a user device.

30. The apparatus of claim 22, wherein the apparatus comprises a media server.

31. An apparatus for wireless communications, comprising:
means for generating a plurality of packets of data, each packet comprising a header and a payload of media data;
means for receiving opaque data related to a payload of at least one packet of the plurality of packets of data, wherein the opaque data comprises user-generated data related to the payload of the at least one packet to be played simultaneously with the payload of the at least one packet;
means for embedding the opaque data in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level; and
means for transmitting the plurality of packets of data to the target user device,
wherein the opaque data and the payload of the at least one packet are configured to be played simultaneously by the target user device that receives the plurality of packets of data.

32. An apparatus for wireless communications, comprising:
means for receiving a plurality of packets of data, each packet comprising a header and a payload of media data;
means for receiving opaque data related to a payload of at least one packet of the plurality of packets of data, wherein the opaque data comprises user-generated data related to the payload of the at least one packet to be played simultaneously with the payload of the at least one packet, the opaque data embedded in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level;
means for extracting the opaque data from the extension header of the at least one packet and caching the extracted opaque data;
means for transmitting the at least one packet to a first target user device during a group call; and
means for transmitting the extracted opaque data to a second target user device when the second target user device joins the group call after the at least one packet has been transmitted to the first target user device.

33. A non-transitory computer-readable medium for wireless communications, comprising:
at least one instruction to generate a plurality of packets of data, each packet comprising a header and a payload of media data;
at least one instruction to receive opaque data related to a payload of at least one packet of the plurality of packets of data, wherein the opaque data comprises user-generated data related to the payload of the at least one packet to be played simultaneously with the payload of the at least one packet;
at least one instruction to embed the opaque data in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level; and
at least one instruction to transmit the plurality of packets of data to the target user device,
wherein the opaque data and the payload of the at least one packet are configured to be played simultaneously by the target user device that receives the plurality of packets of data.

34. A non-transitory computer-readable medium for wireless communications, comprising:

at least one instruction to receive a plurality of packets of data, each packet comprising a header and a payload of media data;

at least one instruction to receive opaque data related to a payload of at least one packet of the plurality of packets of data, wherein the opaque data comprises user-generated data related to the payload of the at least one packet to be played simultaneously with the payload of the at least one packet, the opaque data embedded in an extension header of the at least one packet, wherein the extension header comprises an extension header data field in which the opaque data is embedded and a profile identifier field identifying a profile indicating how the opaque data is to be processed by a target user device, wherein the profile is negotiated with the target user device at the application level;

least one packet, the opaque data embedded in an extension header of the at least one packet, wherein the extension header comprises a profile identifier field identifying a profile indicating how the opaque data is to be processed by a target user device;

at least one instruction to extract the opaque data from the extension header of the at least one packet and caching the extracted opaque data;

at least one instruction to transmit the at least one packet to a first target user device during a group call; and at least one instruction to transmit the extracted opaque data to a second target user device when the second target user device joins the group call after the at least one packet has been transmitted to the first target user device.

* * * * *